(12) United States Patent
Lolli et al.

(10) Patent No.: US 8,336,581 B2
(45) Date of Patent: Dec. 25, 2012

(54) KIT FOR REPAIRING AND INFLATING INFLATABLE ARTICLES

(75) Inventors: Sergio Lolli, Pesaro (IT); Maurizio Marini, Pesaro (IT)

(73) Assignee: Tek Global S.R.L., Pesaro (IT)

(*) Notice: Subject to any disclaimer, the term of this patent is extended or adjusted under 35 U.S.C. 154(b) by 756 days.

(21) Appl. No.: 12/441,805

(22) PCT Filed: Sep. 18, 2007

(86) PCT No.: PCT/IB2007/002688
§ 371 (c)(1),
(2), (4) Date: Aug. 13, 2009

(87) PCT Pub. No.: WO2008/035163
PCT Pub. Date: Mar. 27, 2008

(65) Prior Publication Data
US 2010/0005930 A1    Jan. 14, 2010

(30) Foreign Application Priority Data
Sep. 18, 2006 (IT) .............. TO2006A0662

(51) Int. Cl.
*B65B 1/04* (2006.01)
*B65B 31/00* (2006.01)
(52) U.S. Cl. ..................... 141/38; 152/415
(58) Field of Classification Search ........... 141/38; 152/415
See application file for complete search history.

(56) References Cited

U.S. PATENT DOCUMENTS

| | | | | |
|---|---|---|---|---|
| 5,070,917 A * | 12/1991 | Ferris et al. | ............. | 141/38 |
| 5,403,417 A * | 4/1995 | Dudley et al. | ............. | 156/97 |
| 5,472,023 A * | 12/1995 | Fogal et al. | ............. | 141/9 |
| 6,176,285 B1 * | 1/2001 | Gerresheim et al. | ............. | 152/509 |
| 6,283,172 B1 * | 9/2001 | Thurner | ............. | 141/38 |
| 6,345,650 B1 * | 2/2002 | Paasch et al. | ............. | 141/5 |
| 6,412,524 B1 * | 7/2002 | Fogal, Sr. | ............. | 141/38 |
| 6,454,892 B1 * | 9/2002 | Gerresheim et al. | ............. | 156/115 |
| 6,736,170 B2 | 5/2004 | Eriksen et al. | | |
| 6,766,834 B1 * | 7/2004 | Eckhardt | ............. | 141/38 |
| 6,789,581 B2 * | 9/2004 | Cowan et al. | ............. | 141/38 |
| 6,889,723 B2 * | 5/2005 | Gerresheim et al. | ............. | 141/38 |
| 6,964,284 B2 * | 11/2005 | Eckhardt | ............. | 141/38 |
| 6,968,869 B2 * | 11/2005 | Eckhardt | ............. | 141/38 |
| 7,021,348 B2 * | 4/2006 | Eriksen et al. | ............. | 152/415 |
| 7,028,720 B2 * | 4/2006 | Eckhardt | ............. | 141/38 |
| 7,694,698 B2 * | 4/2010 | Marini | ............. | 141/38 |
| 7,789,110 B2 * | 9/2010 | Marini | ............. | 141/38 |
| 7,798,183 B2 * | 9/2010 | Cegelski et al. | ............. | 141/38 |
| 7,891,385 B2 * | 2/2011 | Yanagi et al. | ............. | 141/38 |
| 8,016,002 B2 * | 9/2011 | Yoshida et al. | ............. | 141/38 |
| 2004/0159365 A1 | 8/2004 | Cowan et al. | | |
| 2004/0173282 A1 * | 9/2004 | Laetgaard | ............. | 141/38 |

* cited by examiner

FOREIGN PATENT DOCUMENTS
WO    WO 03/004328 A    1/2003
WO    WO 2005/084968 A    9/2005

*Primary Examiner* — Timothy L Maust
*Assistant Examiner* — Nicolas A Arnett
(74) *Attorney, Agent, or Firm* — Ladas & Parry LLP

(57) ABSTRACT

A kit for repairing and inflating inflatable articles comprises a compressor unit, a container unit containing a sealant fluid and a fluidic line to connect the compressor unit to the container unit. The kit also comprises a first non-return valve placed along the fluidic line, a duct connected to the fluidic line between the compressor unit and the first non-return valve and a second non-return valve to close the duct; the first and second non-return valves are normally closed and respectively open automatically when the container unit is connected to the fluidic line or when the duct is connected to the inflatable item.

7 Claims, 3 Drawing Sheets

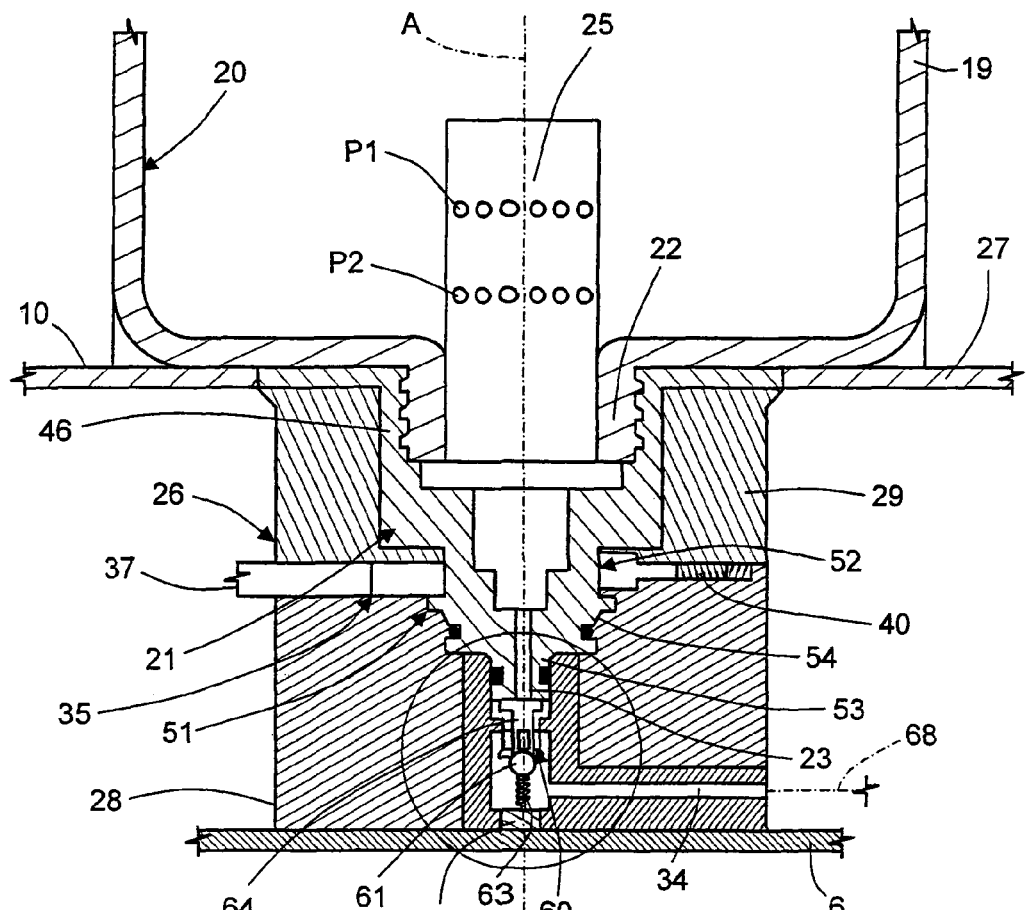
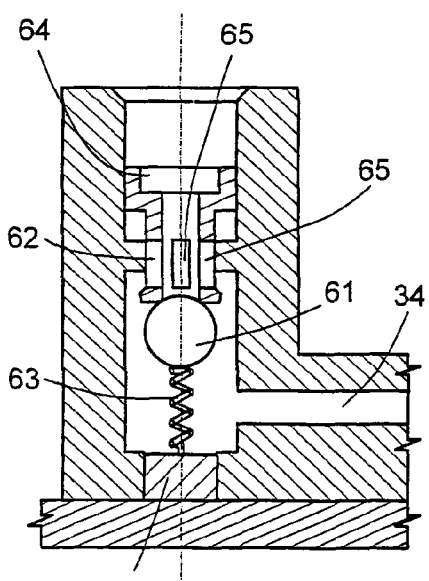
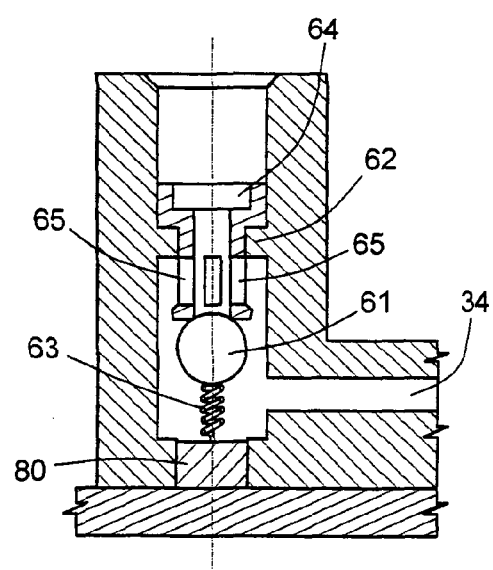

_US 8,336,581 B2_

KIT FOR REPAIRING AND INFLATING INFLATABLE ARTICLES

This application is a 371 of PCT/IB2007/002688 filed on Sep. 18, 2007, published on Mar. 27, 2008 under publication number WO 2008/035163 A and claims priority benefits of Italian Patent Application No. TO2006A000662 filed Sep. 18, 2006, the disclosure of which is incorporated herein by reference.

TECHNICAL FIELD

This invention relates to a kit for inflating and repairing inflatable articles, in particular tyres.

BACKGROUND ART

Kits for inflating and repairing tyres are known comprising an electrically-operated compressor unit for a sealant fluid injected if necessary in the tyre through a flow of pressurised air leading from the compressor unit through a fluidic line.

WO-A1-03004328 describes a kit in which the compressor unit is housed inside a housing and the sealant fluid container is screwed onto a port defined by the housing. In particular, the port is fluidically connected both to the compressor unit and to an outlet hose that can be connected to an inflatable article and, when the container is not screwed to the housing, to repair a tyre, the port is closed by a plug that makes it possible to use the compressor unit separately from the sealant fluid container for inflating the tyre.

However the kit previously described has the drawback that the plug can easily go astray.

In addition, it is not always easy to assemble and disassemble the plug particularly in poor conditions of light such as in the case of use at night on a poorly lighted road. US-A-2004159365 discloses a kit according to the preamble of claim 1. Such kit can be improved to achieve cost effective manufacturing and reduced maintenance efforts maintaining a simple use.

DISCLOSURE OF INVENTION

The scope of the present invention is to provide a kit for inflating and repairing inflatable articles free of the above-mentioned drawbacks.

The scope of the present invention is achieved through a kit for inflating and repairing inflatable articles according to claim 1.

BRIEF DESCRIPTION OF THE DRAWINGS

To enable better understanding of the present invention a description is given now of a preferred embodiment, purely by way of a not limitative example, with reference to the accompanying drawings, in which:

FIG. 2 is a partial section of FIG. 1 according to line II-II;

FIGS. 2a and 2b are two enlarged partial sections of a component of FIG. 2 in two respective operating positions.

BEST MODE FOR CARRYING OUT THE INVENTION

Figure 1:
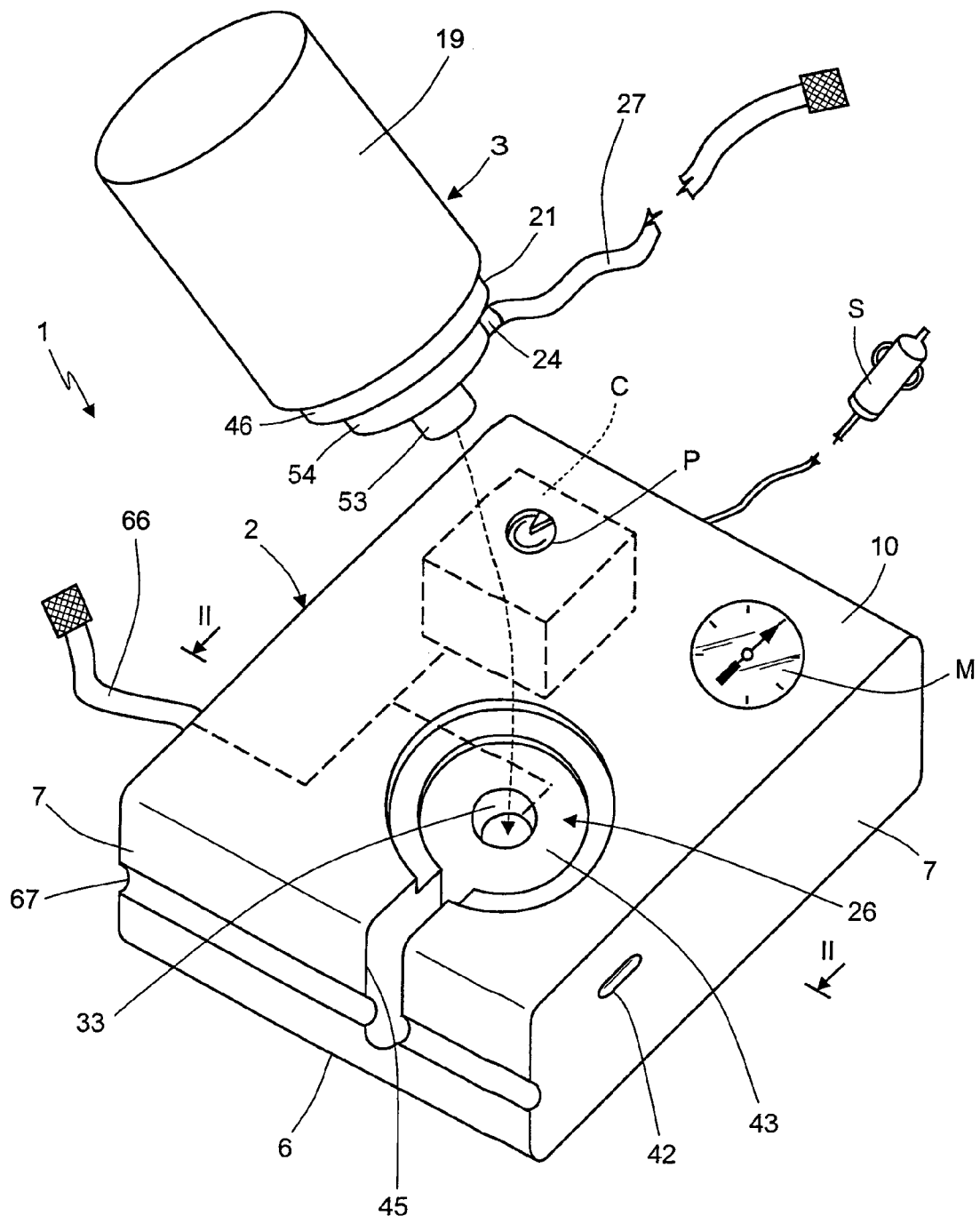
FIG. 1 is a perspective view of a kit for repairing and inflating inflatable articles according to the present invention.

FIG. 1 shows with 1 a kit for the repair and inflation of inflatable articles, in particular tyres. The kit 1 comprises a housing 2, a compressor unit C (shown schematically) preferably constituted of an electric motor that can be operated through a plug S and a reciprocating compressor, and a container unit 3 connected in a dismountable way to housing 2 and containing a known type of sealant fluid.

In particular, housing 2 is substantially parallelepiped and defines an inner chamber for housing the compressor unit C. Housing 2 comprises a base wall 6, side walls 7 (of which only two are shown in FIG. 1), and a top wall 10 substantially parallel to the base wall 6.

Kit 1 also comprises a snap-on connection device 26 housed in the enclosure 2 and cooperating with the container unit 3 as will be better specified below.

Container unit 3 of kit 1 comprises a bottle 19 defining a chamber 20 containing the sealant fluid, and a fluidic unit 21 screwed to a threaded neck 22 of bottle 19.

In particular, fluidic unit 21 defines an inlet port 23 connectable to compressor unit C and an outlet port 24 connectable in use to a tyre to be repaired through a tube 27 connected to outlet port 24.

Container unit 3 also comprises a valve 25 (FIG. 2) interposed between inlet port 23 and outlet port 24 and defining a first and a second plurality of holes P1 and P2 normally closed by a slide valve that is not shown.

Preferably, a valve 25 is used as described in patent application WO-A1-2005084968 filed by the same applicant. Container unit 3 is connected fluidically and mechanically to housing 2 through snap-on device 26, which is supported by base wall 6.

Connection device 26 (FIG. 2) comprises a base 28 rigidly connected to base wall 6 and a guide member 29 overlaid on the base 28 and supporting container unit 3 in use.

Base 28 defines a cylindrical seat 33 open at the opposite side of the base wall 6 and with an axis A at right angle to the base wall 6, a duct 34 for fluidically connecting seat 33 to compressor unit C.

Snap-on connection device 26 also comprises a stop element 35 sliding in a direction at right angle to axis A and set in a housing defined by base 28.

In particular, stop element 35 cooperates with a spring 40 to keep a pre-established closing position in which stop element 35 prevents extraction of container unit 3.

Stop element 35 also comprises a stem 37 that protrudes from the side of base 28 and is accessible to the user through an opening 42 defined by one of the side walls 7 (FIG. 2).

Guide member 29 is rigidly snap-fastened onto base 28 to define a substantially parallelepiped block.

Guide member 29 defines a hole 43 coaxial with axis A and communicating with seat 33 for guiding the sliding of container unit 3 along the fixed axis parallel with axis A during assembly.

In particular, fluidic unit 21 integrally comprises a cylindrical body 46 screwed to bottle 19 to couple with hole 43 and a radial protuberance defining outlet port 24 and that can be housed in a suitable groove (not shown) defined by guide piece 26.

In particular, this groove passes through the horizontal direction and side wall 7 has a corresponding groove 45 to allow insertion of the tube 27.

Fluidic unit 21 also comprises, on the opposite side to the bottle 19, a catch portion 51 integral with cylindrical body 46 and coaxial with the axis of cylindrical body 46 itself. Catch portion 51 defines an annular groove 52 proximal to cylindrical body 46, a sealing portion 53 distal from cylindrical body 46 and a sealing portion 54 interposed between sealing portion 53 and annular groove 52.

Sealing portions 53, 54 bear respective O-rings that define a fluid tight coupling respectively with duct 34 and seat 33 when container unit 3 is connected to base 28.

FIG. 2 also shows a device for closing duct 34 comprising a non-return valve 60 carried by base 28. In particular, valve 60 comprises a closing element 61 held in a closing position against an annular projecting part 62 inside duct 34 through the action of a spring 63. In particular, closing element 61 is shaped in such a way that the action of the compressed air coming from the compressor acts to keep valve 60 closed and is added to that of spring 63.

Valve 60 also comprises a cover 80 for fitting closing element 61 and an axially mobile opening element 64 defining a plurality of radial holes 65 shaped to be closed by annular projecting part 62 and prevent the passage of fluid when valve 60 is closed.

Figure 3:
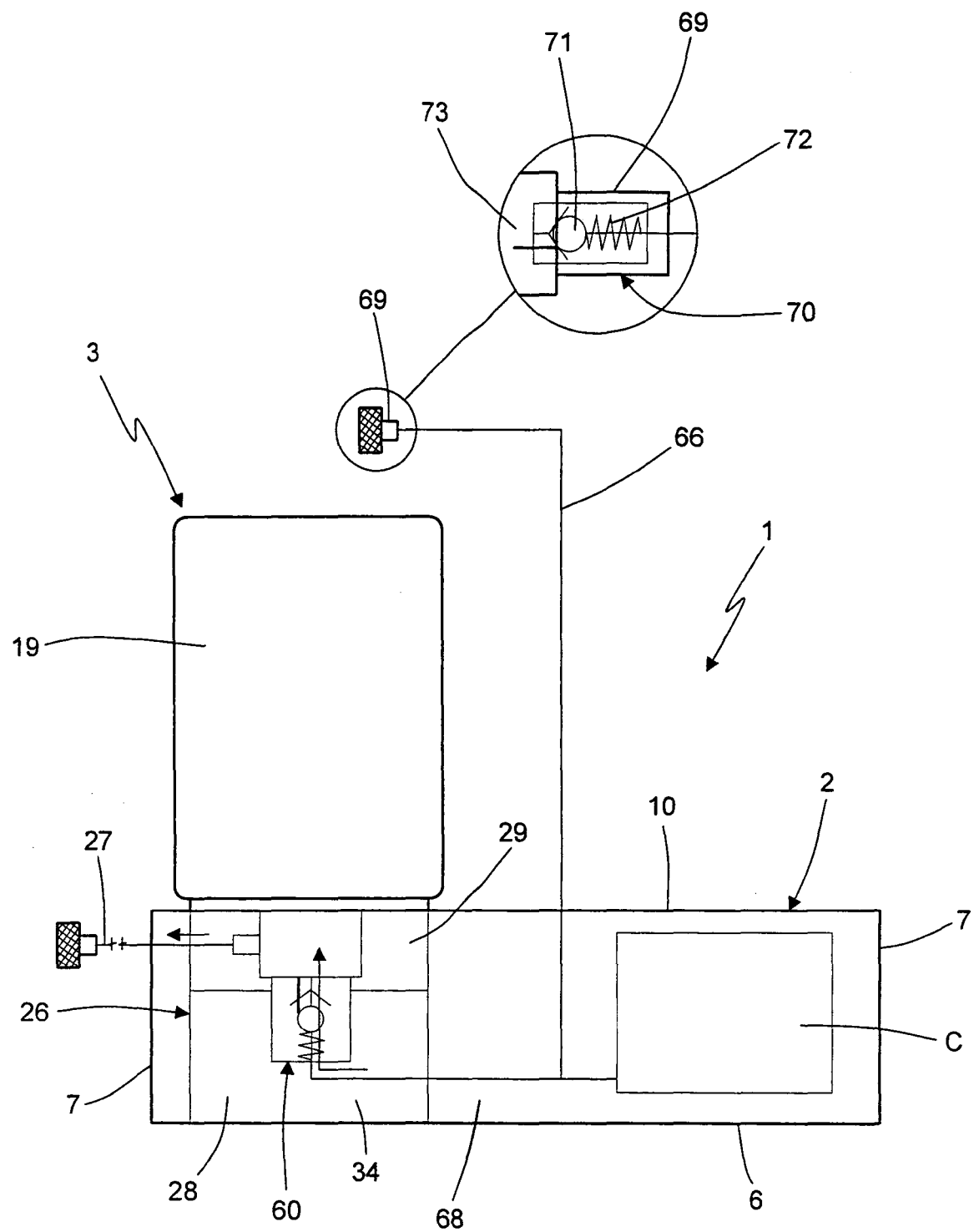
FIG. 3 is a diagram of a fluidic circuit of the kit of FIG. 1.

The kit 1 also comprises a duct 66 connected to compressor unit C to allow tyre inflation alone without the container unit 3 being connected to snap-on connection device 26. As shown in FIG. 1, duct 66 can be housed in a groove 67 defined by the side walls 7 of housing 2. FIG. 3 schematically shows a fluidic circuit connecting container unit 3 and duct 66 to the compressor unit C.

Fluidic circuit comprises a line 68 for connecting compressor unit C to duct 34 of base 28 and also includes duct 66 connected through a T-joint to line 68 between compressor unit C and base 28.

In addition, duct 66 leads to a ring nut connecting device 69 to allow connection with the valve of a tyre and a non-return valve 70. Non-return valve 70 comprises a closing element 71 and a spring 72 fitted like the corresponding components of the valve 60.

Preferably, valve 70 is integrated in connection device 69 and comprises a respective opening element 73 to allow the opening of valve 70 when connecting device 69 is connected to the tyre in the same way as described previously for the valve 60.

The kit 1 operates as described below.

Normally, container unit 3 and tube 27 are disconnected from base 28 and non-return valves 60, 70 are both closed by the action of the respective springs 63 and 72.

When it is necessary to inflate an inflatable item, the user takes duct 66 out of groove 67 and screws connecting device 69 on the valve of the article concerned.

At the same time, opening element 73 moves into contact against the valve of the inflatable article and opens closing element 71 against the action of spring 72 to allow the passage of the compressed air coming from compressor unit C. At the same time, non-return valve 60 stays closed (FIG. 2A) because the container unit 3 is disconnected and the closing element 61 is pressed against the annular projecting part 62 both by spring 63 and by the pressure generated by compressor unit C inside the fluidic circuit and in particular in line 68.

Conversely, when it is necessary to repair a tyre, container unit 3 is inserted in the correct position through the coupling of cylindrical body 46 with hole 43 and of port 24 with groove 45. In the inserted position, container unit 3 is rigidly constrained to base wall 6 through snap-on connecting device 26.

While container unit 3 is inserted on the snap-on connecting device 26, sealing portion 53 moves closing element 61 downwards against the action of spring 63 and consequently opens the radial holes 65 (FIGS. 2B and 3).

Therefore the pressurised air flows from duct 34 towards the inside of the bottle 19 through valve 25 and allows the injection of the sealant fluid through tube 27.

Simultaneously, non-return valve 70 stays closed due to the action of spring 72 and the pressure inside duct 66.

The kit 1 described previously makes it possible to achieve the advantages described below.

Non-return valves 60, 70 allow the automatic selection of the correct path that the pressurised air has to follow to fulfill the two possible requirements of the user, i.e. repairing a tyre or inflating an inflatable article.

This way, the only operations necessary for inflating are connecting the plug S to an electrical socket, connecting the connection device 69 to the valve of the item to be inflated and activating the compressor unit C through an ON button P checking the pressure through a pressure gauge M.

To repair a tyre it is simply necessary to add the step of inserting the container unit 3 in the snap-on connection device 26.

In addition, the snap-on connection simplifies assembly of container unit 3 to further facilitate the use of the kit also when puncturing occurs at night and in conditions of poor visibility in general.

Lastly, it is clear that it is possible to make changes and variants to the kit 1 described and shown without however going beyond the protective scope of the invention, as defined in the accompanying claims.

In particular, it is possible to use valves 60, 70 in a kit made so that the container unit 3 is normally constrained to the snap device 26 and is disconnected only to be replaced.

Furthermore, valve 70 may not comprise spring 72. In such case, closing element 71 is movable in a free manner between the opening position and the closing position when compressor C is switched off. When compressor C is switched on and valve 70 is not connected to any inflatable article, the pressure of duct 66 bias closing element 71 that moves to close valve 70.

Closing position is thus maintained for the entire period during which duct 66 is pressurized and is not maintained when duct 66, is not pressurized and valve 70 is disconnected from an inflatable article.

Furthermore, it is possible to provide that closing element 71 and opening element 73 define a single body.

The invention claimed is:

1. A kit for repairing and inflating inflatable articles comprising a compressor unit for generating compressed air, a container unit containing a sealant that can be injected in the inflatable article through a flow of pressurised air coming from said compressor unit, a fluidic line for connecting said compressor unit to said container unit, comprising a first non-return valve for closing said first fluidic line, a duct, connected to said fluidic line between said first non-return valve and said compressor unit and a second non-return valve for closing said duct, wherein said first non-return valve is normally closed and opens automatically when said container unit is connected to said fluidic line and said second non-return valve comprises a first mobile element configured to cooperate in contact with said inflatable article to open said second non-return valve when said duct is connected to said inflatable article.

2. The kit according to claim 1, wherein said first non-return valve comprises a second mobile element configured to cooperate in contact with said container unit to open said first non-return valve when said container unit is connected to said fluidic line.

3. The kit according to claim 1, wherein said container unit is connected to said fluidic line through snap-on connecting means.

4. The kit according to claim 3, wherein said snap-on connecting means are supported by a base wall of a housing containing said compressor unit.

5. The kit according to claim 4, wherein said snap-on connecting means support said container unit in a position suitable for use.

6. The kit according to claim 1, wherein said second non-return valve comprises a closing element movable from an opening position and a closing position and said second non-return valve is configured such that said closing position is not maintained if said duct is not pressurized by said compressor unit.

7. The kit according to claim 1, wherein said second non-return valve is normally closed and opens automatically when said duct is connected to said inflatable article.

* * * * *